UNITED STATES PATENT OFFICE.

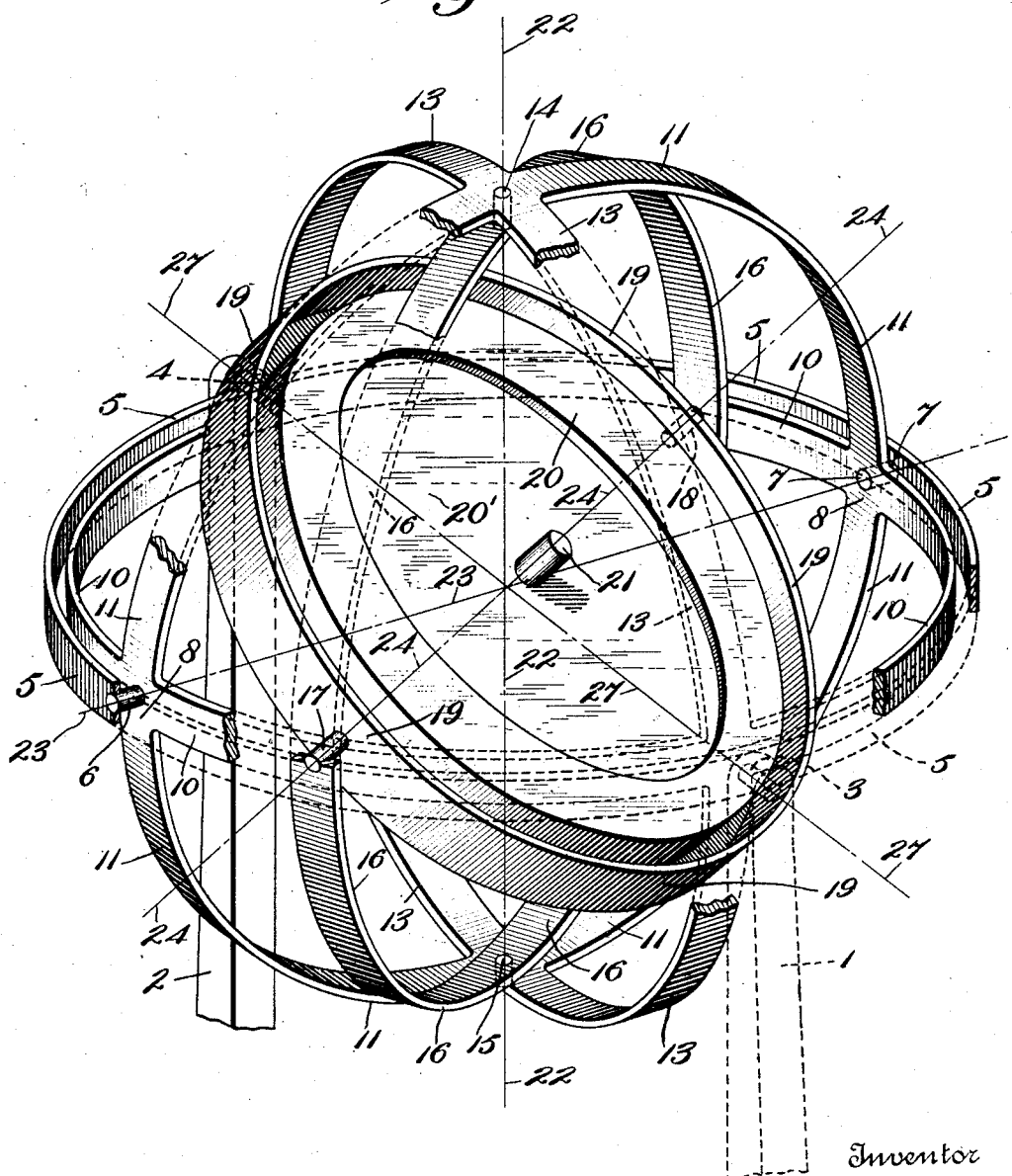

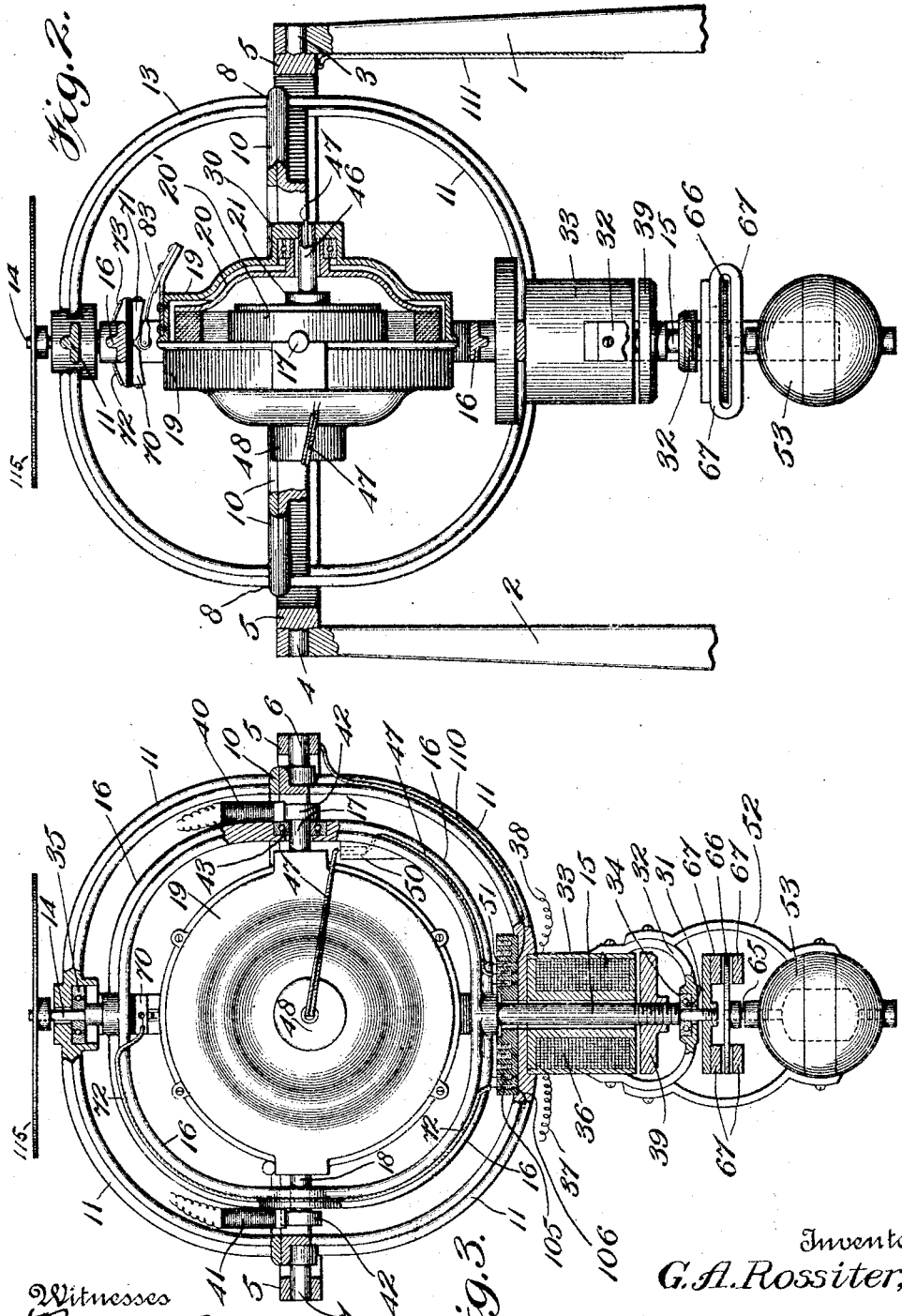

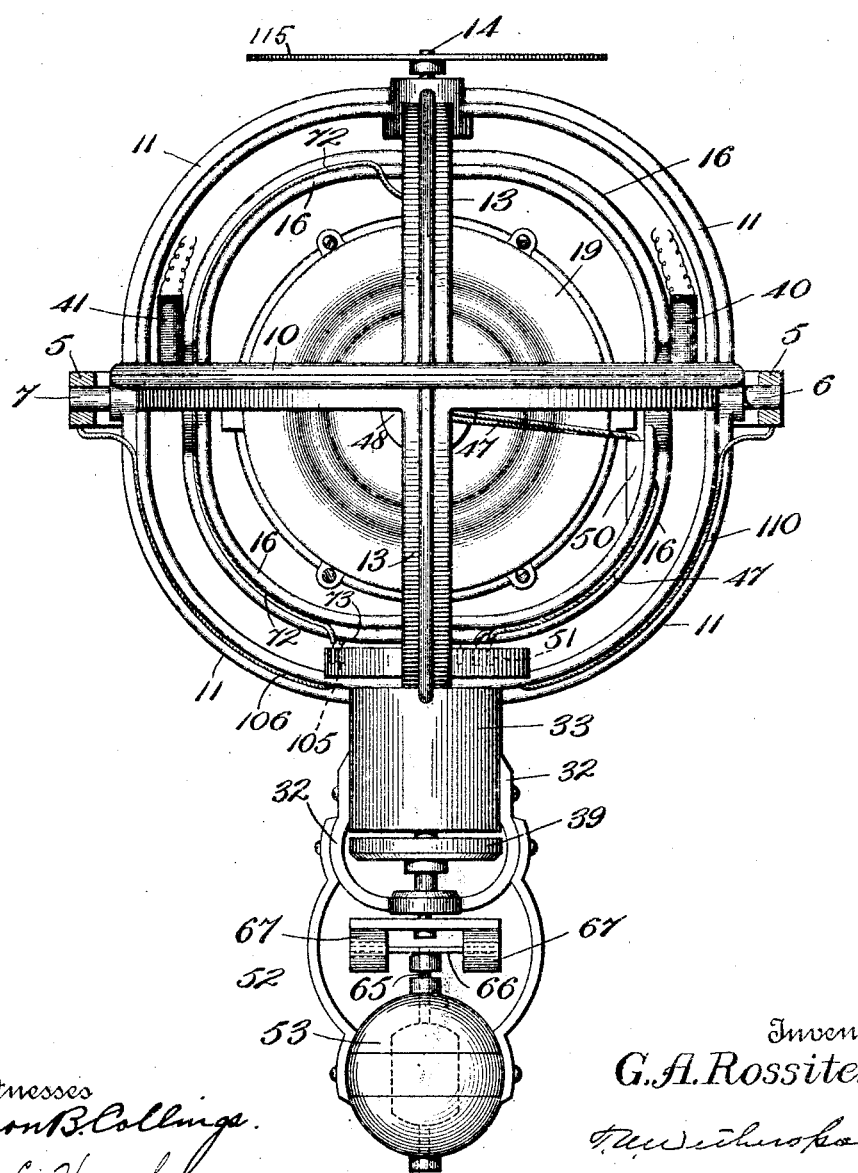

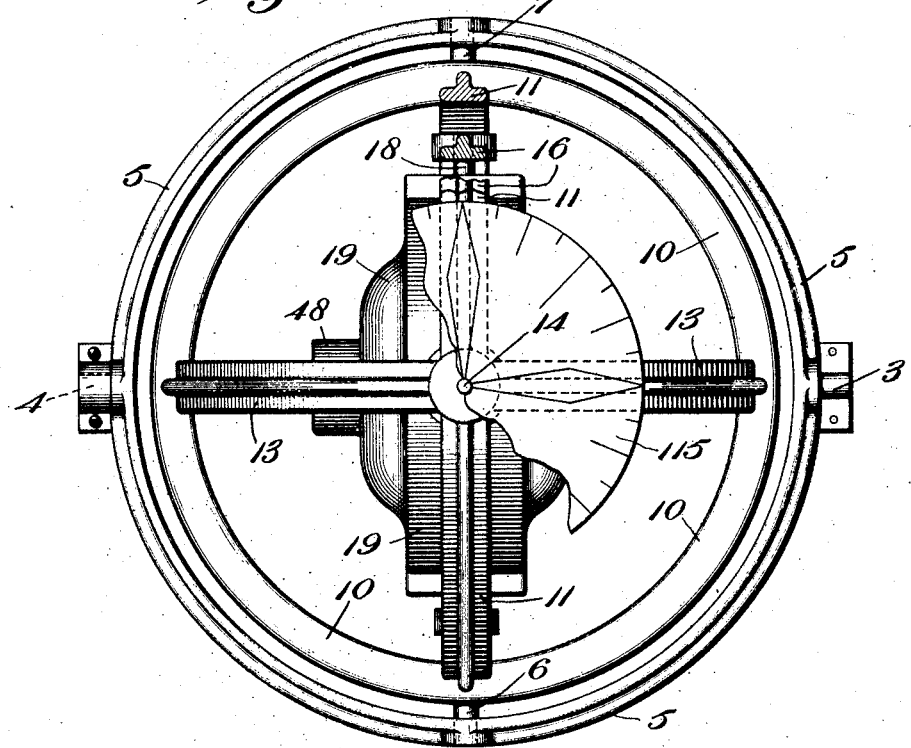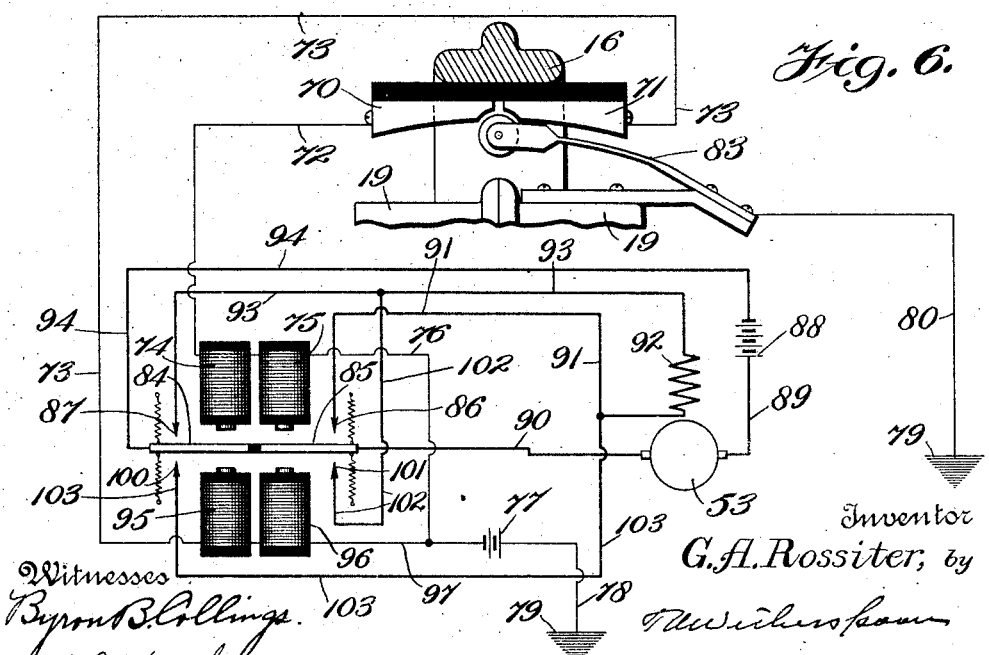

GEORGE A. ROSSITER, OF NEW YORK, N. Y., ASSIGNOR TO THE CARRIE GYROSCOPIC CORPORATION, OF NEW YORK, N. Y., A CORPORATION OF NEW YORK.

GYROSCOPIC COMPASS.

1,308,683.   Specification of Letters Patent.   Patented July 1, 1919.

Application filed January 4, 1915. Serial No. 423.

*To all whom it may concern:*

Be it known that I, GEORGE A. ROSSITER, a citizen of the United States, residing at New York, in the county of New York and State of New York, have invented certain new and useful Improvements in Gyroscopic Compasses; and I do hereby declare the following to be a full, clear, and exact description of the invention, such as will enable others skilled in the art to which it appertains to make and use the same.

This invention relates to gyroscopic compasses, and has for its object to provide a compass of this nature, which will be simpler in construction, more efficient in action, and less costly to construct than those heretofore proposed.

With these and other objects in view the invention consists in the novel details of construction and combinations of parts more fully hereinafter described and particularly pointed out in the claims.

Referring to the accompanying drawings forming a part of this specification in which like numerals designate like parts in all the views:—

Figure 1 is a diagrammatic perspective view, with certain parts broken away, of an apparatus illustrating the principles of the invention;

Fig. 2 is a partly sectional view in elevation of certain parts of a compass made in accordance with the invention;

Fig. 3 is a part sectional view taken at right angles to that shown in Fig. 2;

Fig. 4 is an elevational view of the parts shown in Fig. 3, with the ring 5 shown in section;

Fig. 5 is a plan view partly broken away of the parts shown in Fig. 4; and

Fig. 6 is a diagrammatic view showing one arrangement of the circuits.

Referring to Fig. 1, the fundamental principles on which this invention rests will first be described, and then the actual construction of the compass itself will be disclosed in connection with the remaining figures.

1 and 2 indicate any suitable supports for the pivots 3 and 4, carried by the ring 5. At 90 degrees from the pivots 3 and 4 the said ring 5 supports the pivots 6 and 7, carried by the frame 8, composed of the horizontal ring member 10 extending 360 degrees inside the ring 5, and of the ring member 11 extending 360 degrees in a plane perpendicular to said ring member 10. Said frame 8 is also provided with the ring member 13 extending 360 degrees in a plane perpendicular to the planes of the rings 10 and 11.

The said pivots 6 and 7 are located at the intersection of the rings 10 and 11 as shown; and at the intersection of the rings 11 and 13 are the pivots 14 and 15, carried by the ring 16, as will be clear from the drawings. At 90 degrees from the pivots 14 and 15 are the pivots 17 and 18 supported by the ring 16. Located inside the casing 19 is the rotating disk member or rotor 20, provided with suitable bearings to be more fully described below, and located in said rotor or disk 20 is the stator 20', mounted on a stationary shaft 21 also more fully disclosed hereinafter.

It will now be seen that with the gimbal mounting disclosed, the ring 5 may oscillate on an axis 27 passing through the pivots 3 and 4, and thus oscillate or raise and lower the pivots 6 and 7 located at right angles to said pivots 3 and 4, and with them also the rings 10, 11 and 13. It is also clear that if the pivots 3 and 4 are moved in azimuth by their supports, 1 and 2, the said rings 10, 11 and 13 will likewise move in azimuth.

The oscillating movement of the said pivots 6 and 7, of course, will impart a like oscillating movement to the pivots 14 and 15, which in turn will oscillate the pivots 17 and 18 and the casing 19 by means of the ring 16, provided the disk 20 is not rotating. The ring 16 being capable of freely swinging on the pivots 14 and 15, or on the axis 22 passing through said pivots it follows from the law of the gyroscope if the disk 20 is rotating, the pivots 17 and 18 and ring 16, will remain stationary, when the frame 8 is moved in azimuth by means of the said pivots 6 and 7 as above mentioned. Further, since the frame 8 is free to swing on the pivots 6 and 7, or on the axis 23 passing through said pivots, it is evident that the ring 10 of said frame 8, if weighted will always maintain its horizontal plane, as the ship moves from place to place over the earth's surface, and that the axis 22 will always point to the zenith.

It is well known from the properties of a gyroscope that if it be set in rapid rotation, it will, if suspended with three degrees of freedom as is the case here, strongly tend to maintain its original plane of rotation; or rather a plane parallel to said original plane, as the instrument is carried from place to place over the earth's surface.

In order to make this clear, let us suppose the parts in Fig. 1 to be so moved that the axis 24 passing through the pivots 17 and 18 will coincide with the axis 23 passing through the pivots 6 and 7, and that the casing 19 be so turned on the said axis 24 that the shaft 21 of the rotor 20' will lie horizontally in the axis 27. In this disposition of the parts the rings 11 and 16 and the casing 19 will be in the same vertical plane, and the shaft 21 will lie in the same horizontal plane with the rings 5 and 10. This is the position of the parts illustrated in Figs. 2 and 3. Now let us further suppose the instrument is on the equator with its shaft or axle 21 pointing true north and south and the disk 20 in the east and west vertical plane, or plane of the equator. Now let the disk 20 be rapidly rotated, while the instrument is carried due north. The disk will strongly tend to maintain its original position with respect to the heavens, or will remain in planes parallel to the plane of the equator as the ring 16 by means of the pivots 14 and 15 is caused through gravity to turn around or relatively to the pivots 17 and 18.

In other words, owing to the curvature of the earth and to the axis 22 always remaining vertical, it is evident that the axis 22 will move from the plane of the disk 20 to a new vertical position for each change in latitude.

If the plane of the disk 20 or casing 19, in Fig. 1 is the original plane of the equator, the axis 22 will have moved in a clockwise direction, as seen in said figure from the plane of said casing to the position illustrated, and it will continue to move relatively to said original plane so long as the latitude changes. But each movement of said axis 22, carries the ring 16 with it, and therefore causes said ring to move around or with respect to said pivots 17 and 18, as the latitude changes. This movement of the ring 16 around the pivots 17 and 18 due to the curvature of the earth generates more or less friction and will be more fully discussed below.

Again, while the original plane of the disk 20 is thus maintained, by its gyroscopic action, if the ship turns in azimuth from its true north and south course, so that the supports 1 and 2 will through the ring 5 turn the pivots 6 and 7 from the axis 24 into the position shown in Fig. 1, or in a clockwise direction, then the frame 8 will turn around the axis 22, and the said axes 23 and 24 will separate into the positions shown in Fig. 1.

The friction generated in this last named movement in azimuth will appear almost entirely at the lower pivot 15, for substantially all the weight in the finished compass is carried by this pivot, and in order to avoid the errors that would otherwise be due to this friction, the weight of the instrument is supported on a magnetic field as will be more fully disclosed below.

Coming now to the finished instrument disclosed in Figs. 2 to 6, the parts corresponding to those in Fig. 1 are designated by the same numerals, and an inspection of said figures will make it clear that starting with the shaft 21 of the stator 20' its weight is borne by the hub 30 of the casing 19, which in turn transmits the weight to the pivots 17 and 18 and to the ring 16.

The ring 16 in turn transmits the weight of the parts so far mentioned to its lower elongated pivot 15 best shown in Fig. 3, the lower end of which is provided with the collar 31, resting on the bracket 32 supported from the magnet casing 33 rigid with the ring 11. Said ring 11 accordingly transmits the weight of the parts to the pivots 6 and 7, which transmits it to the ring 5, and the latter in turn transmits the said weight to the pivots 3 and 4 and to the deck supports 1 and 2. It will now be seen that the weight of the parts that are under the control of the disk 20 is borne by the collar 31 on the pivot 15, and that substantially all the friction which would be generated through changes in azimuth would appear at said collar 31. In order to guide the shaft 15 laterally, a companion collar 34 is provided and which is separated from the collar 31 by a set of antifriction balls as shown. And a similar lateral guide or ball bearing 35 is provided for the upper pivot 14 of said ring 16.

Located in said magnet casing 33 are the magnet coils 36 provided with the terminals 37 and 38, and located on the extreme end of the pivot 15 is the armature 39, so that when said coils 36 are excited, the armature will be attracted and the contacting surfaces of the collar 31 and bracket 32 sufficiently separated to relieve said bracket of all weight of said parts. In this condition the gyroscopic disk 20 and its associated parts float on a magnetic field, and are devoid of mechanical friction, for the guide bearings 34 and 35 do not receive any weight and are therefore substantially frictionless. It accordingly results from this construction that the movements of the ship in azimuth or any movements of the disk 20 in azimuth independently of the ship will not be accompanied by any friction tending to cause errors of the compass.

In the same way, any friction that may be engendered by a movement of the ring 16 around, or relatively to the pivots 17 and 18 as the ship changes its latitude may be obviated by exciting the magnets 40 and 41, whose poles are adapted to attract armatures 42 carried by said pivots 17 and 18, which may also be provided with ball bearings 43.

It will now be clear that errors due to friction generated when the latitude or azimuth changes are entirely obviated, and it remains to show how the current is carried to the parts.

As above stated the stator 20' and its shaft 21 remain stationary while the rotor or disk 20 revolves. The end 46 of the shaft 21 is hollow as shown and conducting wires 47 are led thereinto and out of the other end 48 as will be clear from Figs. 2 and 3. It is preferred to employ a three phase alternating current motor of the rotary field type, and current is taken from the stator 20' and carried to the coils of the rotor 20 by collector rings not shown. The wires 47 dip into a mercury contact 50, then follow the ring 16 and dip into a mercury contact 51 all as will be clear from the drawings.

The mercury contacts 50 and 51 as well as the rings 5 and 10 are kept horizontal by the pendulous weights formed by the magnet 36 and its associated parts including the bracket 52 and direct current motor 53 to be presently disclosed. These weights act to always maintain the pivot 14 vertical as the latitude and longitude changes, as will be readily understood.

It is well known that as above stated, a gyroscope will strongly tend to maintain its original plane of rotation if suspended with three degrees of freedom as is the case in Fig. 1. This statement, however, supposes the rotating parts to turn on an axis passing through the center of gravity of the rotating system.

But it is equally well known on the other hand, if one end of the rotating axis of the rotating system is weighted, or pressed down upon and if said system is mounted as a portion of a compass, as is here the case, then the rotating member when displaced, will automatically so change its plane of rotation as to set itself parallel to the plane of the equator and with its rotating axis pointing true north and turning in the same direction as the axis of the earth.

That is to say, in practice the axis of the casing 19 passing through the pivots 17 and 18 is preferably located slightly above the center of gravity and axis of the disk 20, and it results from this that when the disk 20 is not rotating it will automatically assume a vertical position with its axis horizontal. When the disk is rotating on the other hand, the weighted casing 19 will act as a pressure on one end of the axis of disk 20, thus slightly restraining one of its degrees of freedom and will cause the said disk axis to automatically assume a north and south direction, with the said disk and axis turning in the same direction as the earth.

Not only will the north seeking end of the axis thus automatically move to the true north, but it will pass it, whereupon the same action as above disclosed will now act to move said north seeking end in an opposite direction and said end will accordingly vibrate back and forth on each side of the north point, until it almost becomes quiet. This vibration of the north seeking end of the axis is called "precessing" owing to the movement being one of precession.

It follows that this turning of the disk 20 in azimuth while "precessing" would cause considerable friction on the bearing 31, 32, and accompanying errors, were it not for the frictionless magnetic support above disclosed.

These precession movements of the north seeking end of the axis sometimes continue so long that it is desirable to damp them, and to this end the direct current motor 53, suspended on the bracket 52 is provided. This motor carries on its shaft 65 a non-magnetic metal disk 66, located between the poles 67 of a pair of permanent magnets carried by the pivot 15, so that foucault currents are set up in the disk 66 which reacting on the magnets cause the above vibratory movements of the north seeking end of the shaft 21 to be damped. The disk 66 is turned by the motor in one direction when the said north seeking end is on one side of the north point and is turned in an opposite direction when said end is on the other side of said north point, as will now be disclosed.

The ring 16 (Fig. 6) carries two insulated contacts 70 and 71, from which lead the wires 72 and 73 respectively. The wire 72 is joined to the coils of the magnets 74 and 75, from the latter of which leads the wire 76 to the battery 77 from which leads the wire 78 to the frame of the machine or to a ground 79. From said frame or ground leads the wire 80 (Fig. 6) to the frame and to the casing 19 provided with the spring contact 83, adapted to close circuit with either of the contacts 70 or 71.

Supposing the magnets 74 and 75 are energized by closing the circuit with the contact 70, the armatures 84 and 85 will be attracted, closing circuits at the contacts 86 and 87. Current will now flow from battery 88 over wire 89 through motor 53, over wire 90 to armature 85, contact 86, wire 91, through field coils 92, over wire 93 to contact 87, armature 84, and over wire 94 back to battery 88; thus turning the motor 53 in such a direction as to check the swing of the frame 19 and to break the circuit between the contacts 70 and 83. The swing in the opposite direction of the ring 16, will now close circuit between the contacts 83 and 71, whereupon current will flow over wire 73 to and through the coils of magnets 95 and 96, over wire 97 to battery 77, over wire 78 to ground 79, and over wire 80 back to contact 83.

The armatures 84 and 85 will now close circuits at the contacts 100 and 101, whereupon current will flow from battery 88 over wire 89 through the rotor of motor 53, over wire 90, armature 85, contact 101, over wire 102, wire 93, through field coils 92 (in a direction opposite to that previously described) over wire 103 to contact 100, armature 84, and over wire 94 back to battery 88. The reversal of the current through the field coils 92 reverses the motor 53, and therefore the direction of rotation of the disk 66. It accordingly follows that the "precessing" movement of the north seeking end of the axis 21 will soon be damped out.

In practice the wire 72 is led along one side of the ring 16 as indicated in Fig. 4, and the wire 73 may be in a cable with it, or lead along the other side of said ring. The ends of the wires 72 and 73 dip into mercury contacts 105, and the wires may be led out by the cable 106 to the ring 5 (see Fig. 4) from which the two wires are led to their respective magnets and battery. These wires being all insulated from the frame the return circuit may be joined to the frame. Further the wires leading to the motor 53 (not shown except in Fig. 6) may be led from the battery 88 to the ring 5 and to the ring 11 in the manner of the wire 106, and thence down the casing 33 and bracket 52 to said motor in a manner that will be clear from the drawings.

The alternate current through the rotor or disk 20 after leaving the wires 47 and mercury contact 51, is conveniently led over the wires 110 to the ring 5, and over the wires 111 (see Figs. 2, 3 and 4) to the alternate current generator. The circuit for exciting the magnet 36 is not illustrated. It is joined to the wires 38, and may be conveniently controlled by a hand operated rheostat, it being desirable to excite just enough power in the magnet 36 to float the rotating system and supporting parts on the magnetic field thus created by the magnet 36 without jamming the parts. Sufficient vertical play in the ball bearings is provided for this purpose.

In order that the points of the compass may be readily located around the horizon, there is mounted on the vertical axis 14 a compass card 115, and a little consideration will show that as the ring 16 must remain stationary in azimuth with the casing 19 and rotor or disk 20, the horizontal axis of said ring and the axis of said disk 20 will always be in the same vertical plane, so that points on the card 115 in a vertical north and south plane passing through the pivot 14 and perpendicular to the plane of ring 16, will be on the north and south line. From these points the card may be graduated and the graduations associated with a suitable "lubbers" point (not shown), which will turn in azimuth with the ship around said north and south points on the card.

It is also well recognized that when one degree of freedom is slightly restrained as by weighting the axis of the casing 19, gyroscopic disk or rotor 20, said axis will not point true north and south as above stated, unless the instrument is stationary on the earth's surface. That is to say, if the vessel is sailing true north and south, or if the instrument is moved in any other direction, its true motion will be the resultant of its motion of travel over the earth's surface, and its motion in an easterly direction due to the rotation of the earth. The direction of this resultant motion will cause the axis of the rotor or disk to point to one side or the other of the true north and must be allowed for. It is also well known, that certain corrections must be made for latitude.

From the foregoing it will now be clear that if the rotating axis of the disk is possessed of three degrees of freedom, as is the case in Fig. 1, wherein the axis 24 passing through the pivots 17 and 18, also passes through the centers of gravity of the casing 19 and disk 20, then the above phenomena of precession of the ends of the disk axis will not occur. But on the other hand, if said axis 24 passes above the disk axis and the center of gravity of the disk as it does in the finished machine and as is illustrated in Fig. 2, then one degree of freedom or the movement of said disk in one direction will be slightly restrained, and the disk axis 21 will automatically seek the north point.

It will now also be clear that in operation, the current is sent through the rotor 20, which maintains its rotation at a high speed; that the magnet 36 is excited which causes the weight of the rotating parts and their supports to be floated on a magnetic field and thus does away with all friction due to turning the instrument in azimuth and also does away with the friction due to the precessing of the rotor 20. When desired the magnets 40 and 41 are excited through circuits not shown, which eliminates all friction due to the bearings of the pivots 17 and 18 turning under or around said pivots as the latitude changes. By thus eliminating all friction, the errors which would otherwise occur in the operation of the compass are also eliminated.

It is obvious that those skilled in the art may vary the details of construction as well as the arrangement of parts without departing from the spirit of the invention and therefore it is not desired to limit this invention to the above disclosure except as may be required by the claims.

What I claim is:—

1. In a gyroscopic compass the combination of a rotary gyroscopic member; means for restraining its movements in one direction; means for pivotally mounting said member adapted to swing in azimuth; vertically disposed means for floating the weight of said member on a magnetic field; and means comprising a magnetic pole and a movable metal member to dampen the precessional movements of said member while seeking a true east and west plane.

2. In a gyroscopic compass the combination of a gyroscopic disk; means for supporting said disk; on an axis passing through said disk above the center of gravity of the same; and means for supporting the weight of said first named means on a magnetic field to avoid friction when the said supporting means are turned in azimuth.

In testimony whereof I affix my signature in presence of two witnesses.

GEORGE A. ROSSITER.

Witnesses:
 JOHN E. BEATTIE,
 A. ORBACH.

Copies of this patent may be obtained for five cents each, by addressing the "Commissioner of Patents, Washington, D. C."